US007259477B2

(12) United States Patent
Klikic et al.

(10) Patent No.: US 7,259,477 B2
(45) Date of Patent: Aug. 21, 2007

(54) UNINTERRUPTIBLE POWER SUPPLY

(75) Inventors: Damir Klikic, Waltham, MA (US);
Mirza A. Beg, Pepperell, MA (US);
Mark R. Melanson, Chelmsford, MA
(US); Edward Kotlyar, Needham, MA
(US); Jeffrey B. Samstad, Brookline,
MA (US)

(73) Assignee: American Power Conversion Corporation, West Kingston, RI (US)

( * ) Notice: Subject to any disclaimer, the term of this patent is extended or adjusted under 35 U.S.C. 154(b) by 253 days.

(21) Appl. No.: 10/641,746

(22) Filed: Aug. 15, 2003

(65) Prior Publication Data
US 2005/0036248 A1 Feb. 17, 2005

(51) Int. Cl.
*H02J 7/00* (2006.01)
*H02J 9/00* (2006.01)
*H02J 3/26* (2006.01)

(52) U.S. Cl. .......................................... 307/65; 307/14

(58) Field of Classification Search ............ 307/64–66, 307/14
See application file for complete search history.

(56) References Cited

U.S. PATENT DOCUMENTS

| 4,665,322 | A | * | 5/1987 | Eishima et al. ............... 307/66 |
| 4,763,013 | A | | 8/1988 | Gvoth, Jr. et al. |
| 5,241,217 | A | | 8/1993 | Severinsky |
| 5,315,533 | A | | 5/1994 | Stich et al. |
| 5,465,011 | A | | 11/1995 | Miller et al. |
| 5,642,002 | A | | 6/1997 | Mekanik et al. |
| 5,684,686 | A | | 11/1997 | Reddy |
| 5,939,802 | A | * | 8/1999 | Hornbeck .................... 307/87 |
| 5,982,652 | A | | 11/1999 | Simonelli et al. |
| 6,069,412 | A | | 5/2000 | Raddi et al. |
| 6,201,309 | B1 | | 3/2001 | Honda et al. |
| 6,310,783 | B1 | | 10/2001 | Winch et al. |
| 6,356,470 | B1 | * | 3/2002 | Sadler et al. ................ 363/65 |
| 6,400,043 | B1 | | 6/2002 | Batson et al. |
| 6,433,444 | B1 | | 8/2002 | de Vries |
| 6,455,954 | B1 | * | 9/2002 | Dailey ........................ 307/66 |

(Continued)

FOREIGN PATENT DOCUMENTS

EP   0 574 628 A1   12/1993

OTHER PUBLICATIONS

Embedded Systems 2002 [Online], "In-system Programming (ISP) via CAN bus," Jan. 29, 2002, pp. 1-30; retrieved from the Internet: URL:www.biakom.com/2>; retrieved on Nov. 11, 2004.
International Search Report for PCT/US2004/026192 mailed Feb. 28, 2005.

*Primary Examiner*—Brian Sircus
*Assistant Examiner*—Michael Rutland-Wallis
(74) *Attorney, Agent, or Firm*—Lowrie, Lando & Anastasi, LLP.

(57) ABSTRACT

An uninterruptible power supply (UPS) system includes an AC power input configured to receive AC power from a single-phase AC power source or a multi-phase AC power source, a DC power source, an output circuit including a power output, a controllable switch configured to selectively couple at least one of the AC power input and the DC power source to the output circuit, and a processor coupled and configured to affect operation of the output circuit depending upon which of single-phase and multi-phase operation of the UPS is indicated.

34 Claims, 11 Drawing Sheets

U.S. PATENT DOCUMENTS

| | | |
|---|---|---|
| 6,639,383 B2* | 10/2003 | Nelson et al. ............... 320/116 |
| 6,654,265 B2* | 11/2003 | Sadler et al. ................. 363/65 |
| 6,803,678 B2 | 10/2004 | Gottlieb et al. |
| 2002/0136042 A1 | 9/2002 | Edevold et al. |
| 2003/0048647 A1 | 3/2003 | Harris et al. |
| 2003/0052544 A1* | 3/2003 | Yamamoto et al. ........... 307/66 |
| 2003/0052644 A1 | 3/2003 | Cohen et al. |
| 2003/0107859 A1 | 6/2003 | Hsu et al. |
| 2005/0162019 A1 | 7/2005 | Masciarelli et al. |
| 2005/0168073 A1 | 8/2005 | Hjort |

* cited by examiner

UNINTERRUPTIBLE POWER SUPPLY

FIELD OF THE INVENTION

The invention relates to operation and/or installation of uninterruptible power supply systems.

BACKGROUND OF THE INVENTION

Uninterruptible power supply (UPS) systems are useful for protecting devices against power loss. UPSs typically have an input for an AC line source, rectification and boost circuitry, an inverter, and a battery. The UPSs can selectively supply power from either the AC line source to the load or from the battery to the load. When the battery is not being used to supply the load, it may be charged by power from the AC line source. The AC line source may be single phase or three phase, and UPSs exist that are configured to handle one or the other type of AC power. UPSs are typically configured to switch to battery if the input line voltage is beyond an allowable voltage range.

Various battery configurations may be used in UPSs, and battery charger failure may be detected so that failing UPSs can be repaired. UPSs may use single string or multi-string battery configurations. Single-string configurations typically provide a positive battery voltage and multi-string configurations typically provide positive and negative battery voltages. Which configuration a particular UPS has can be programmed into the UPS to help ensure proper operation of the UPS. The batteries can be monitored to detect failures and this is typically done by monitoring battery voltage and other parameters such as current flowing into or out of the battery, e.g., to determine if the battery has been exhausted. Batteries may drain, e.g., during storage due to leakage into battery bus capacitors and other components that are electrically connected to the batteries. Different UPSs, with different nominal battery bus voltages and/or different battery configurations typically have different battery packs. Further, replacing batteries or battery packs, at least for a mid-range capacity UPS (e.g., between about 3 KVA and about 10 KVA) typically involves disconnecting the UPS from the line source power and disassembling the UPS significantly to access the batteries/battery pack(s).

Various fault conditions may be detected and responsive actions taken. For example, inverter voltage may be monitored to detect load short circuits. If a short circuit is detected, the UPS may switch to bypass mode to connect the line source directly to the load. A UPS may also start in bypass mode so that an output short circuit is connected to the line source during startup, before the UPS has a chance to detect the short circuit.

Further, various components of UPSs can be replaced as they fail and/or as upgrades become available. For example, fans used to cool UPSs and/or microcontrollers used to control UPSs can be replaced by disassembling the UPSs.

Several factors influence aspects of UPS design, including growing demands for stable, reliable and continuous supply of electricity to sensitive electronic equipment and for increasingly compact devices to provide this power. There is a demand for power backup units to occupy a small amount of space and to provide significant amounts of stable power, e.g., to computers, servers, and other devices. UPSs provide backup power, but typically produce significant amounts of heat in doing so. To cool UPS components, one or more fans are often used to flow air through the UPS. Competing interests are that the cooling effect of the fans, as well as the noise and cost of the fans, is proportional to their size and number. The fans are typically inside a housing of the UPS and can be replaced by removing the UPS from its rack (if rack-mounted) and/or disassembling the UPS to access the fan.

As UPSs are used to provide continuous power to sensitive electronic devices, it is desirable that a UPS can be serviced/repaired without interrupting the power supplied to the electronic devices and without disturbing the physical location of the UPS. For example, it is desirable to replace a fan of a rack-mounted UPS without removing the UPS from the rack. Further, mid-range tower (stand-alone) or rack-mounted UPSs typically have large batteries/battery packs that require two or more people and/or lifting equipment to handle.

SUMMARY OF THE INVENTION

In general, in an aspect, the invention provides an uninterruptible power supply (UPS) system comprising an AC power input configured to receive AC power from a single-phase AC power source or a multi-phase AC power source, a DC power source, an output circuit including a power output, a controllable switch configured to selectively couple at least one of the AC power input and the DC power source to the output circuit, and a processor coupled and configured to affect operation of the output circuit depending upon which of single-phase and multi-phase operation of the UPS is indicated.

Implementations of the invention may include one or more of the following features. The system further comprises a user-selectable switch, coupled to the processor, that indicates which of single-phase and multi-phase operation of the UPS is applicable. The system further comprises a phase imbalance monitor coupled to the processor and to at least two AC input lines of the AC power input for receiving at least two corresponding voltage signals from the multi-phase AC power source, the imbalance monitor configured to provide an imbalance indication of imbalance of the at least two corresponding voltage signals. The processor is configured to determine from the imbalance indication whether multi-phase operation of the UPS is applicable. The phase imbalance monitor is configured to aggregate the at least two corresponding voltage signals and compare the aggregated signal to a reference. The system further comprises a user-selectable switch, coupled to the processor, that indicates which of single-phase and multi-phase operation of the UPS is applicable, and wherein if the user-selectable switch indicates multi-phase operation and the phase imbalance monitor indicates that multi-phase operation of the UPS is inapplicable, the processor causes the controllable switch to couple the DC power source to the output circuit.

Implementations of the invention may also include one or more of the following features. The system further comprises a single-phase voltage monitor coupled to one AC input line of the AC power input for receiving a corresponding input voltage signal and configured to provide indicia of at least one of a voltage and a frequency of the input voltage signal. The processor is configured to cause the controllable switch to connect the DC power source to the output circuit if at least one of the voltage of the input voltage signal has an unacceptable voltage value and the frequency of the input voltage signal has an unacceptable frequency value.

In general, in another aspect, the invention provides a circuit for selectively coupling a battery to a load, the circuit comprising an input for receiving power from the battery, an output for providing power from the circuit to the load, an isolation switch, a resistance coupled to the isolation switch and the output, and a bypass switch coupled to the input and the output and configured to selectively couple the input to the output while bypassing the isolation switch and the resistance, where the isolation switch is configured to selectively couple the input to the resistance.

Implementations of the invention may include one or more of the following features. The isolation switch is coupled to receive a signal indicating whether a logic power supply associated with the circuit is on, and to couple the input to the resistance if the logic power supply is on.

In general, in another aspect, the invention provides a method of powering a load from an AC power source that is providing a voltage below a startup voltage threshold, the method for use in a system that can provide power to the load from the AC power source or from a DC power source. The method comprises initially powering the load from the DC power source, detecting an amount of power use by the load, determining whether the AC power source can provide sufficient power to power the load within at least one limitation on current supplied by the AC power source, and switching from powering the load from the DC power source to powering the load with the AC power source if the AC power source can provide sufficient power to power the load, where a present voltage that can be provided by the AC power source is less than a startup voltage threshold corresponding to a voltage level below which the DC power source is used to start powering the load instead of the AC power source.

Implementations of the invention may include one or more of the following features. Determining whether the AC power source can provide sufficient power to power the load comprises comparing the present voltage that can be provided by the AC source with a varying indication of desired source voltage. The indication of desired source voltage varies substantially continuously as a function of power use by the load. The indication of desired source voltage varies approximately linearly with power use by the load from about 50% of rated load power to about 100% of rated load power.

In general, in another aspect, the invention provides a method of powering a load from a DC power source or an AC power source that is providing a voltage below a threshold voltage, the method for use in a system that can provide power to the load from the AC power source or from the DC power source. The method comprises detecting an amount of power use by the load, determining an amount of current that the AC power source would provide to power the load, switching to powering, or continuing to power, the load with the AC power source if the AC power source can provide sufficient power to power the load within at least one limitation on current to be provided by the AC power source, and switching to powering, or continuing to power, the load with the DC power source if the AC power source is unable provide sufficient power to power the load within the at least one limitation on current to be provided by the AC power source.

Implementations of the invention may include one or more of the following features. Determining the amount of current that the AC power source would provide to power the load comprises analyzing the power use by the load and a present voltage of the AC power source. The analyzing comprises comparing the present voltage of the AC power source with an indication of desired source voltage that varies substantially continuously as a function of power use by the load. The indication of desired source voltage varies approximately linearly with power use by the load from about 50% of rated load power to about 100% of rated load power.

In general, in another aspect, the invention provides a reprogrammable uninterruptible power supply (UPS) system comprising an AC power input configured to receive AC power from a single-phase AC power source or a multi-phase AC power source, a DC power source, an output circuit including a power output, a controllable switch configured to selectively couple one of the AC power input and the DC power source to the output circuit, and a processor coupled to and configured to control the controllable switch to selectively couple one of the AC power input and the DC power source to the output circuit, where the processor is configured to be reprogrammed without disconnecting the power output of the output circuit from a load.

Implementations of the invention may include one or more of the following features. The system further comprises a serial port configured to couple to a data communication line, wherein the processor is coupled to the serial port and configured to be reprogrammed by data received through the serial port. The system further comprises a network interface coupled to the serial port and the processor and configured to receive data from a communication network and to provide signals to the processor to reprogram the processor in accordance with the data received from the communication network. The network interface is configured to provide a user interface to a user connected to the communication network to facilitate reprogramming of the processor. The processor is a flash-based processor.

In general, in another aspect, the invention provides a short-circuit response device for use in an uninterruptible power supply (UPS) system, the device comprising an inverter coupled to an output of power circuitry of the UPS, the inverter being configured to be coupled to a load to provide power to the load, and a processor coupled to the inverter and configured to monitor an inverter output to determine if the inverter output is indicative of a short-circuited load for longer than a threshold amount of time, and to inhibit the load from being connected to a power source coupled to the UPS if the inverter is determined to be coupled to a short circuit.

Implementations of the invention may include one or more of the following features. The processor is configured to send a signal to the inverter to shut the inverter off if the inverter is determined to be coupled to a short circuit. The processor is configured to send a signal to the inverter to inhibit the UPS from being connected in a bypass configuration coupling the power source directly to the load if the load has been determined to be a short circuit. The inverter is configured to limit current provided to the load to a maximum current, the device further comprising a waveshape detector coupled to the inverter and the processor and configured to provide a waveshape indication to the processor of whether a waveshape of the inverter output is valid, wherein if the current provided to the load is at the maximum current, then the waveshape indication is at least one of assumed by the processor to indicate a valid waveshape and made to indicate a valid waveshape by the waveshape detector.

In general, in another aspect, the invention provides an uninterruptible power supply (UPS) system comprising electronic components configured to implement power supply functionality of the UPS, a chassis providing a battery compartment configured to house a plurality of batteries and providing an electronics compartment configured to house the electronic components, the chassis including first and second walls bounding portions of the electronics compartment, the first and second walls providing at least first and second openings, respectively, that provide fluid communication between the electronics compartment and an exterior of the UPS, a battery compartment door movably coupled to the chassis between a closed position inhibiting access to the battery compartment and an open position allowing access to the battery compartment, and a control panel coupled to the electronic components and configured to provide information regarding the electronic components, the control panel being mounted to the battery compartment door.

Implementations of the invention may include one or more of the following features. The system further comprises a fan coupled to the first wall of the chassis and disposed in at least partially-overlapping relation to the first opening, the fan being disposed and configured to produce a flow of air from outside of the UPS into the electronics compartment. The fan is coupled to the first wall with mounting means that are accessible from the exterior of the UPS. The fan is configured to be inserted into the chassis through the first opening.

In general, in another aspect, the invention provides an uninterruptible power supply (UPS) system comprising electronic components configured to implement power supply functionality of the UPS, a chassis providing a battery compartment configured to house a plurality of batteries and providing an electronics compartment configured to house the electronic components, the chassis including first and second walls bounding portions of the electronics compartment, the first and second walls providing at least first and second openings, respectively, that provide fluid communication between the electronics compartment and an exterior of the UPS, a battery compartment door movably coupled to the chassis between a closed position inhibiting access to the battery compartment and an open position allowing access to the battery compartment, and a fan coupled to the first wall of the chassis, the fan being configured to be inserted into the chassis through the first opening.

Implementations of the invention may include one or more of the following features. The fan is disposed in at least partially-overlapping relation to the first opening, the fan being disposed and configured to produce a flow of air from outside of the UPS into the electronics compartment. The fan is coupled to the first wall with mounting means that are accessible from the exterior of the UPS.

In general, in another aspect, for use with a plurality of universal battery modules, the invention provides a first uninterruptible power supply (UPS) configured to receive the plurality of universal battery modules and to couple the plurality of universal battery modules in parallel to provide a first potential difference level, and a second UPS configured to receive the plurality of universal battery modules and to couple the plurality of universal battery modules in series to provide a second potential difference level that is different from the first potential difference level.

Implementations of the invention may include one or more of the following features. The second potential difference level comprises a positive voltage with a first magnitude equal to that of the first potential difference, and a negative voltage with a second magnitude equal to that of the first potential difference. The first UPS and the second UPS are both configured to receive exactly two of the universal battery modules or exactly four of the universal battery modules.

In general, in another aspect, the invention provides a method of determining a failure with DC power supply circuitry for an uninterruptible power supply (UPS), the method comprising measuring a first voltage level provided by a DC power supply of the UPS, measuring a second voltage level provided by the DC power supply of the UPS, making a first determination as to whether the second voltage level is below a threshold voltage level, making a second determination as to whether the second voltage level is less than the first voltage level, and providing a DC power supply circuitry failure indication if the second voltage level is determined to have been less than the corresponding first voltage level at least a failure quantity number of times.

Implementations of the invention may include one or more of the following features. The method further comprises replacing the first voltage level with the second voltage level, and repeating measuring the second voltage level, and making the first and second determinations. The failure indication is provided only if occurrences of the second voltage levels being lower than the corresponding first voltage levels exceed occurrences of the second voltage levels being higher than the corresponding first voltage levels by the failure quantity. The failure indication is provided only if occurrences of the second voltage levels being lower than the corresponding first voltage levels exceed occurrences of the second voltage levels being higher than the corresponding first voltage levels by the failure quantity without the second voltage level exceeding the threshold voltage at any of the occurrences.

Implementations of the invention may also include one or more of the following features. The method further comprises disabling at least one of making the second determination and providing the failure indication if the second voltage level exceeds the threshold voltage level. The method further comprises decrementing a counter if the second voltage level is determined to be less than the corresponding first voltage level, incrementing the counter if the second voltage level is determined to be more than the corresponding first voltage level, and resetting the counter to a reset value if the second voltage level exceeds the threshold voltage level. The method further comprises indicating failure of the power supply circuitry if the second voltage level is less than a voltage level floor. The failure indication indicates a failure of at least one of the DC power supply and a charger coupled to the DC power supply.

In general, in another aspect, the invention provides a mid-range-capacity uninterruptible power supply (UPS) system comprising a chassis, power electronics disposed in the chassis and configured to selectively couple an AC input and a DC input to a load, and a plurality of battery packs configured to be inserted into the chassis and to be connected to the power electronics such that the UPS will have a mid-range capacity between about 3 KVA and about 10 KVA, where each of the plurality of battery packs is configured to meet safety standards for one-person lifting.

Various aspects of the invention may provide one or more of the following advantages. Battery storage time of UPSs may be improved. Battery charger failures in UPSs may be determined based only on battery voltage, e.g., over time. UPS battery charger failure may be determined while being resilient to false alarms, e.g., due to battery voltage decreases. UPS battery charger failure may be determined before battery exhaustion. A UPS battery may be electrically disconnected from a battery bus capacitor and other components. Single-phase and three-phase AC voltage may be interchangeably used on the same UPS. Single-string or multi-string battery configurations may be detected/accounted for automatically, e.g., without programming indicia of the battery string configuration. A UPS fan can be replaced, e.g., in the field, without disassembling the UPS.

A range of acceptable input line voltage may be expanded compared to typical UPS systems. Multiple input-line voltage cutoff values may be used in a UPS, e.g., with an applicable cutoff value being dependent upon a present load and/or present power consumption. UPS microcontrollers can be reprogrammed in-circuit and in-application, e.g., without shutting down the UPS's load. A UPS microcontroller can be reprogrammed while supporting the UPS's load. Multiple battery bus voltages may be provided by a single battery pack configuration. A single battery pack may be automatically configured to different voltage UPSs. An output short circuit can be connected to the output of a UPS without the UPS connecting the short to an input power source of the UPS. UPSs with improved power densities may be used. Larger fans can be provided in UPSs than in previous designs. Improved airflow in UPSs may be provided compared to previous designs. A mid-range, e.g., 3 KVA-10 KVA, UPS can be provided with batteries that are replaceable without disconnecting the UPS from its line power source, and/or that are replaceable by a single person. A UPS can be serviced/repaired while providing continuous power to an electronic device and/or without physically moving the UPS.

These and other advantages of the invention, along with the invention itself, will be more fully understood after a review of the following figures, detailed description, and claims.

DETAILED DESCRIPTION OF PREFERRED EMBODIMENTS

Embodiments of the invention provide techniques for improved electrical and/or thermal operation, and improved installation and/or repair of uninterruptible power supply (UPS) systems. A UPS can be selectively coupled to a single-phase or three-phase AC power source and appropriate monitoring performed to determine if and when to switch to battery backup power. Backup batteries are connected to a battery capacitor through a switch (e.g., a transistor or relay). A current-limiting device is connected between backup battery string and a battery capacitor to limit current from the backup battery string during startup. The UPS can be started with a voltage from the AC power source being below a threshold amount, with the load being supplied by battery power, and a determination made as to whether the AC voltage is sufficient to power the load after startup. Battery voltage can be read over time, e.g., periodically, and a battery charger failure determination predicated on multiple readings of decreased voltage. A single battery pack configuration with multiple battery packs can be used with multiple UPSs with different voltage requirements, with circuitry of the different UPSs applying power from the batteries differently to provide the respective required voltages. Batteries are disposed in a module configured to be replaced by a single person. An inverter of the UPS can be turned off in response to detection of an output short circuit. A UPS fan can be disposed externally to a housing of the UPS and accessed/replaced without disassembling the UPS. The UPS fan can be disposed by itself in a wall of an electronics compartment of the UPS, with a control panel of the UPS being disposed in a door to a battery compartment of the UPS. Microcontroller programming of the UPS can be upgraded via a serial port connection or a network connection. Other embodiments are within the scope of the invention.

Figure 1:
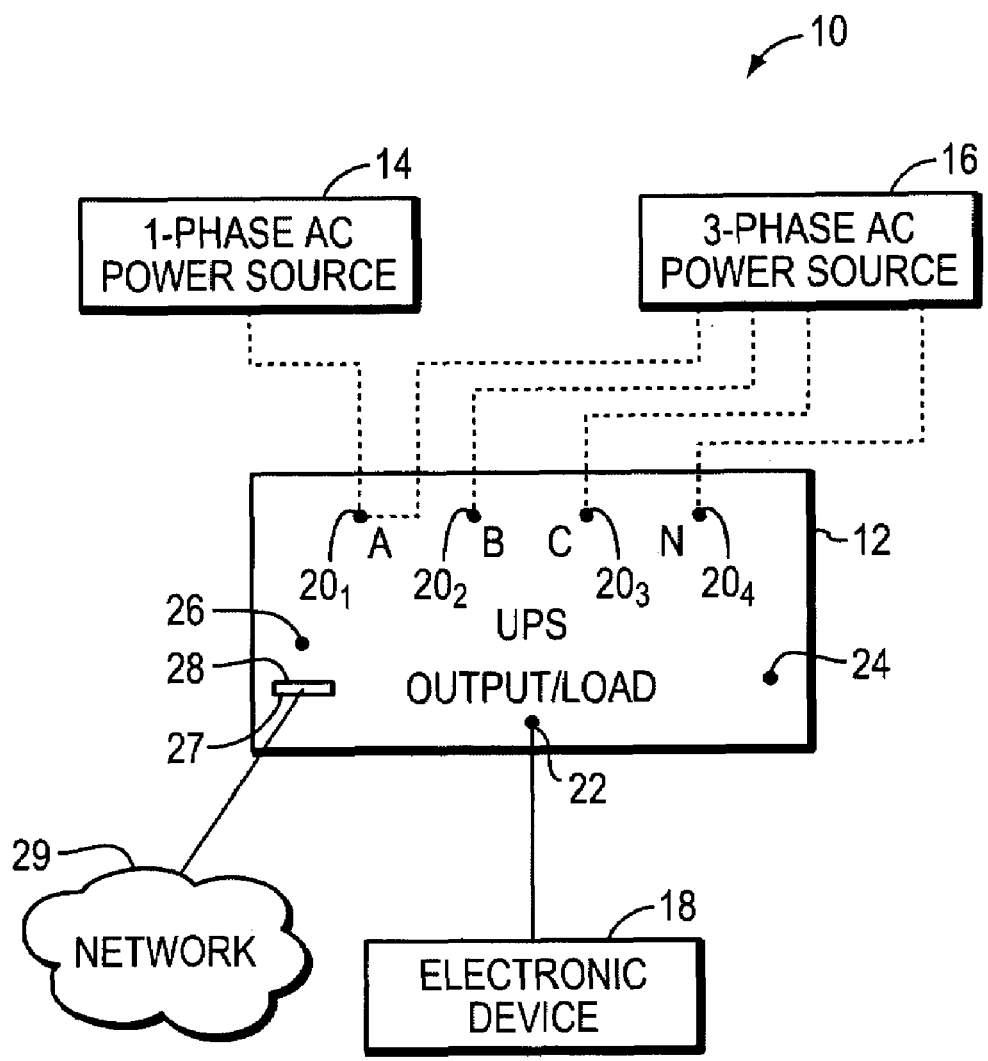
FIG. 1 is a simplified diagram of a system employing an uninterruptible power supply (UPS).

Referring to FIG. 1, a system 10 includes a UPS 12, a single-phase AC power source 14, a three-phase AC power source 16, and an electronic device 18. The UPS 12 is configured to selectively supply utility power from one of the sources 14, 16, or from one or more batteries of the UPS 12, to the electronic device 18. The electronic device 18 is typically a device for which power interruptions are undesirable, e.g., a computer or a server. The UPS 12 includes four inputs $20_1$-$20_4$ for receiving a single-phase line or three-phase lines, and a neutral line, from the sources 14, 16. The UPS 12 also includes an output 22 for connecting to a load, here the electronic device 18. The UPS 12 also includes a serial input port 24 for receiving serial data transmissions.

Figure 2:
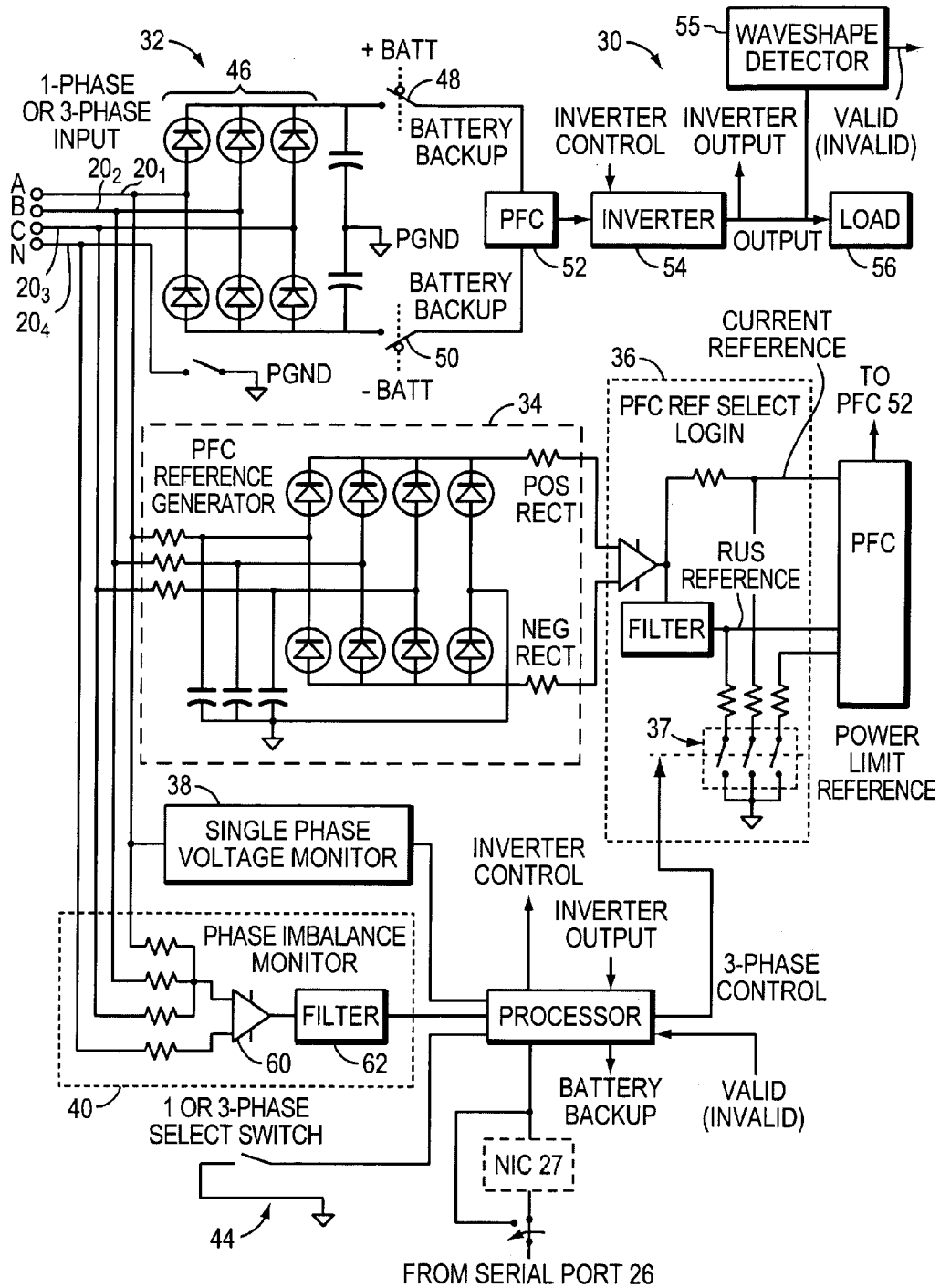
FIG. 2 is a circuit diagram of power routing, monitoring, and controlling electronics of the UPS shown in FIG. 1.

Referring also to FIG. 2, circuitry 30 of the UPS 12 includes power supply circuitry 32, a power factor correction (PFC) reference generator 34, PFC reference select logic 36, a single-phase voltage monitor 38, a phase imbalance monitor 40, a processor (here a microprocessor) 42, and a single-phase/three-phase select switch 44. Either single-phase or three-phase power can be received by the power circuitry 32, rectified by a rectifier section 46, and either this power or power provided by batteries at positive and negative battery transfer switches 48, 50, supplied to a PFC circuit 52 and an inverter 54 and output to a load 56. The circuitry 30, in particular the monitors 38, 40, the microprocessor 42, and the switch 44 are configured to accommodate either single-phase or three-phase AC input power.

The monitors 38, 40, the microprocessor 42, and the switch 44 are configured so that the PFC REF select logic 36 is properly configured for single-phase or three-phase AC power. The switch 44 is a user-selectable switch configured to be actuated by a user to indicate whether the circuitry 30 should operate in a single-phase AC or a three-phase AC mode by coupling or de-coupling a voltage to the microprocessor 42. The circuitry 30 can accept three-phase AC power whether the switch 44 is in a single-phase position or a three-phase position, but the operation of the circuitry 30 may be different based on the position of the switch 44. If the switch 44 is in the single-phase position, the microprocessor 42 may ignore an output signal of the phase imbalance monitor 40 as discussed below. If the switch 44 indicates single-phase operation, the processor 42 causes three 3-phase/1-phase switches 37 of the PFC REF select logic 36 all to be open. If the switch 44 indicates three-phase operation, the processor 42 causes the three 3-phase/1-phase switches 37 of the PFC REF select logic 36 all to be closed. Regardless of whether the switch 44 is in the single-phase position, or the three-phase position, the single-phase voltage monitor 38 monitors the voltage on a selected input line.

The single-phase voltage monitor 38 is coupled to the input line $20_1$ and configured to monitor and provide indicia to the processor 42 of the voltage and frequency of the signal on the line $20_1$ with reference to neutral line $20_4$. The line $20_1$ to which the monitor 38 is connected is the line 20 that is preselected, as preferably indicated on the UPS 12, for receiving single-phase power. The monitor 38 is configured to provide output signals to the processor 42 to be used to determine the voltage quality and frequency of the signal on the line $20_1$.

The phase imbalance monitor 40 is configured to continuously detect and provide indicia of phase imbalance of voltages on the lines $20_1$-$20_3$ to the microprocessor 42. The phase imbalance monitor 40 includes an operational amplifier 60 with one of its inputs coupled to the three-phase power lines $20_1$-$20_3$ through resistors and the other of its inputs coupled to the neutral line $20_4$ and its local reference through resistors. The amplifier 60 is coupled to a filter 62 that is coupled to the microprocessor 42. Voltages on the lines $20_1$-$20_3$ combine and become differentially compared by the amplifier 60 against the neutral. Indicia of the cumulative voltage from the three lines $20_1$-$20_3$ compared to neutral are provided to the filter 62 that filters the indicia, and provides filtered indicia to the microprocessor 42.

The processor 42 is coupled to the outputs of the single-phase voltage monitor 38, the phase imbalance monitor 40, and the switch 44, and is configured to process output signals from each of these devices. If the switch 44 is in the single-phase position (e.g., closed), the microprocessor 42 may ignore an output signal of the phase imbalance monitor 40 (the phase imbalance signal). If the switch 44 is in the three-phase position (e.g., open), the microprocessor 42 processes the phase imbalance signal. Regardless of the position of the switch 44, the microprocessor 42 processes the output signal from the single-phase voltage monitor 38.

With the switch 44 positioned to indicate three-phase AC power operation, the UPS 12 will deliver acceptable output power quality while the three-phase input power is within acceptable limits as determined by the processor 42. With the switch 44 positioned to indicate single-phase or three-phase AC power operation, the processor 42 is configured to determine whether the absolute voltage and frequency of the signal on the line $20_1$ is acceptable, e.g., within acceptable ranges, and whether the imbalance of the phases of the voltages on the lines $20_1$-$20_3$ is within an acceptable range. For example, the processor 42 may check if the frequency is between about 45 Hz and about 65 Hz (i.e., about 10% below a nominal frequency of 50 Hz, e.g., for Europe, and about 10% above a nominal frequency of 60 Hz, e.g., for the United States), and indicate a failure if it is not. Regarding the imbalance determination, for ideal three-phase signals, the sum of the signals on the lines $20_1$-$20_3$ is zero at all times with respect to the line $20_4$. The processor 42 can check to see if the voltage sum of the three phases exceeds an imbalance failing threshold, e.g., of about 1.1V. If so, then the processor 42 can indicate a failure of the three-phase input and transfer to backup battery power from the AC power source 16 until the imbalance is acceptable. The processor 42 may require the aggregate voltage to return to a lower imbalance than the imbalance failing threshold, e.g., 0.9V, before the processor 42 will end the failure indication and transfer back to input AC power from backup battery power. An acceptable input voltage range may be, e.g., from about 150 VAC RMS to about 280 VAC RMS. If the acceptable condition/range for any of the frequency, voltage, or three-phase imbalance is not met, then the processor 42 will cause the UPS 12 to switch to battery for powering the load 56 until all conditions are met. The decision to switch to battery may be made based on one or more samples of values exceeding one or more of the designated limits. The processor 42 can cause the switch to battery by sending the battery backup signal to cause the transfer switch(es) 48 (50) to close.

The processor 42 is configured to determine whether the load 56 can be properly powered by the input voltage within one or more constraints on the operation of the circuit 30. For example, the current used by portions of the circuit 30 may be limited and thus the processor 42 may determine, given a load to be driven, whether the AC power source 14, 16 can provide the appropriate power without exceeding one or more limits on the current used by the UPS 12. The amount of current to be provided by the AC source 14, 16 can be inferred/determined by the processor 42 knowing the power used by the load and the voltage available from the AC source 14, 16. Thus, for any given load power, there may be a minimum acceptable source voltage given the limit(s) on current that can be used.

Figure 3:
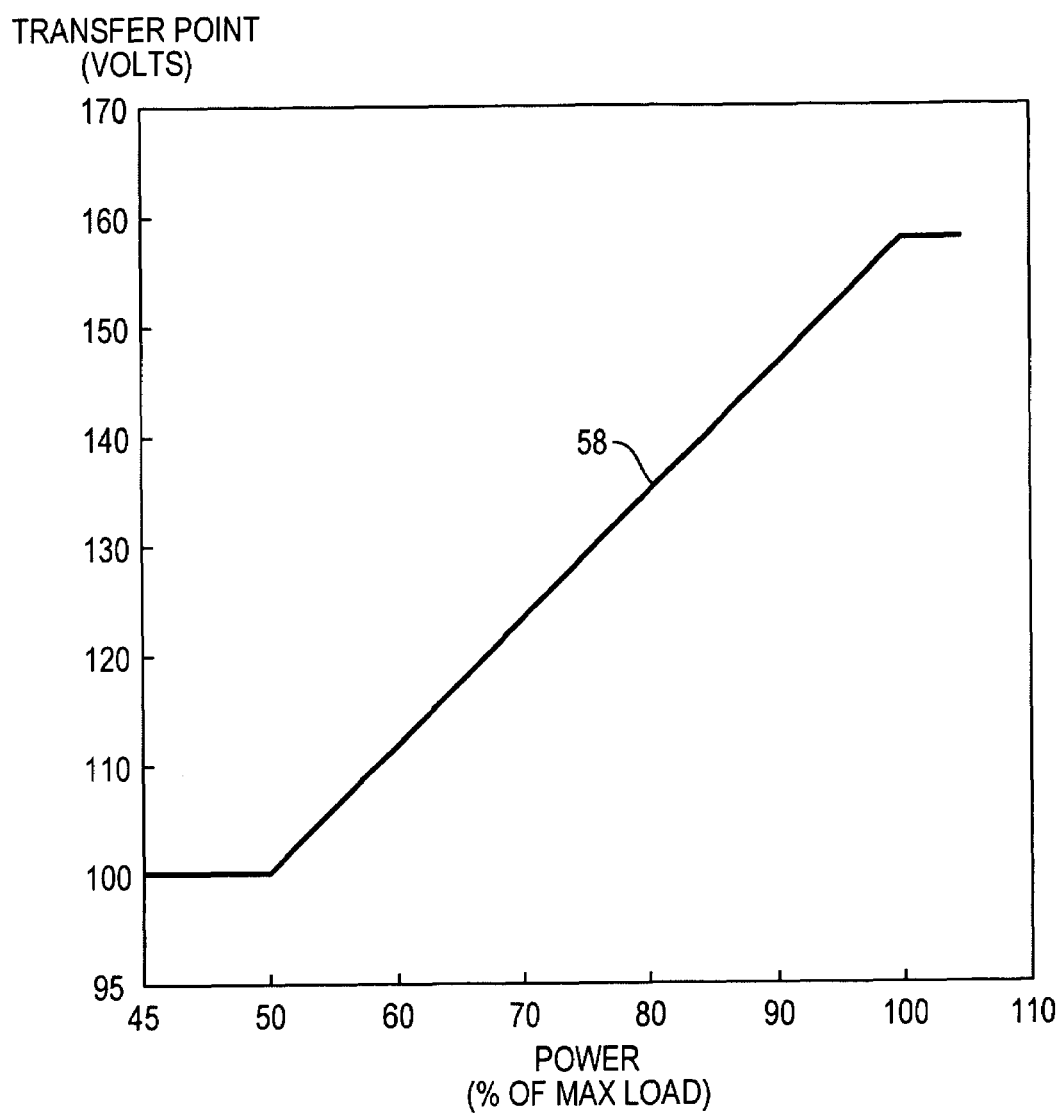
FIG. 3 is a plot of minimum input voltage versus percent of rated load.

The acceptable voltage on the line $20_1$ may vary, e.g., as a function of the present load relative to the maximum rated load. Referring to FIG. 3, a plot 58 shows that for a UPS rated at 10 KVA and 8 kW, with a maximum input voltage of 280 VAC RMS, a minimum input voltage varies from about 100 VAC RMS to about 160 VAC RMS. As shown, the minimum voltage is about 100 VAC for a load drawing power below about 50% of the maximum load power for which the UPS 12 is rated. For loads drawing between about 50% and 100% of the maximum load power for which the UPS 12 is rated, the minimum input voltage varies linearly from about 100 VAC RMS to about 160 VAC RMS. The values provided are exemplary only, and the linear variation of the minimum input voltage, and the range over which it varies linearly, are also exemplary. Also, the plot 58 is shown as being continuous, although the plot 58 may be substantially, yet not completely, continuous in that it may be a set of many discrete values of pairs of load-power values and input-voltage values. Other variations of minimum input voltage dependence are within the scope of the invention.

With the switch 44 positioned to indicate single-phase AC power operation, the UPS 12 will deliver acceptable output power quality while the power on the single-phase line $20_1$ input power is within acceptable limits as determined by the processor 42. This holds true regardless of whether power is supplied by the single-phase source 14 or the three-phase source 16 (FIG. 1). With the switch 44 positioned to indicate single-phase AC power operation, the processor 42 determines whether the signal on the line $20_1$ has a voltage within acceptable limits and a frequency within acceptable limits as discussed above. If the voltage and/or frequency is outside of the acceptable values, then the processor 42 causes the UPS 12 to switch to battery backup for powering the load 56.

Further, although the processor 42 may ignore the phase imbalance signal with the selector switch 44 positioned to indicate single-phase AC power, the processor 42 may analyze the phase imbalance signal nonetheless. The processor 42 may determine that three-phase power is being supplied to the circuit 30, e.g., if the voltage imbalance is acceptable, and operate as though the switch 44 indicated three-phase AC power, including closing the 3-phase/1-phase switches of the PFC REF select logic 36.

Figure 4:
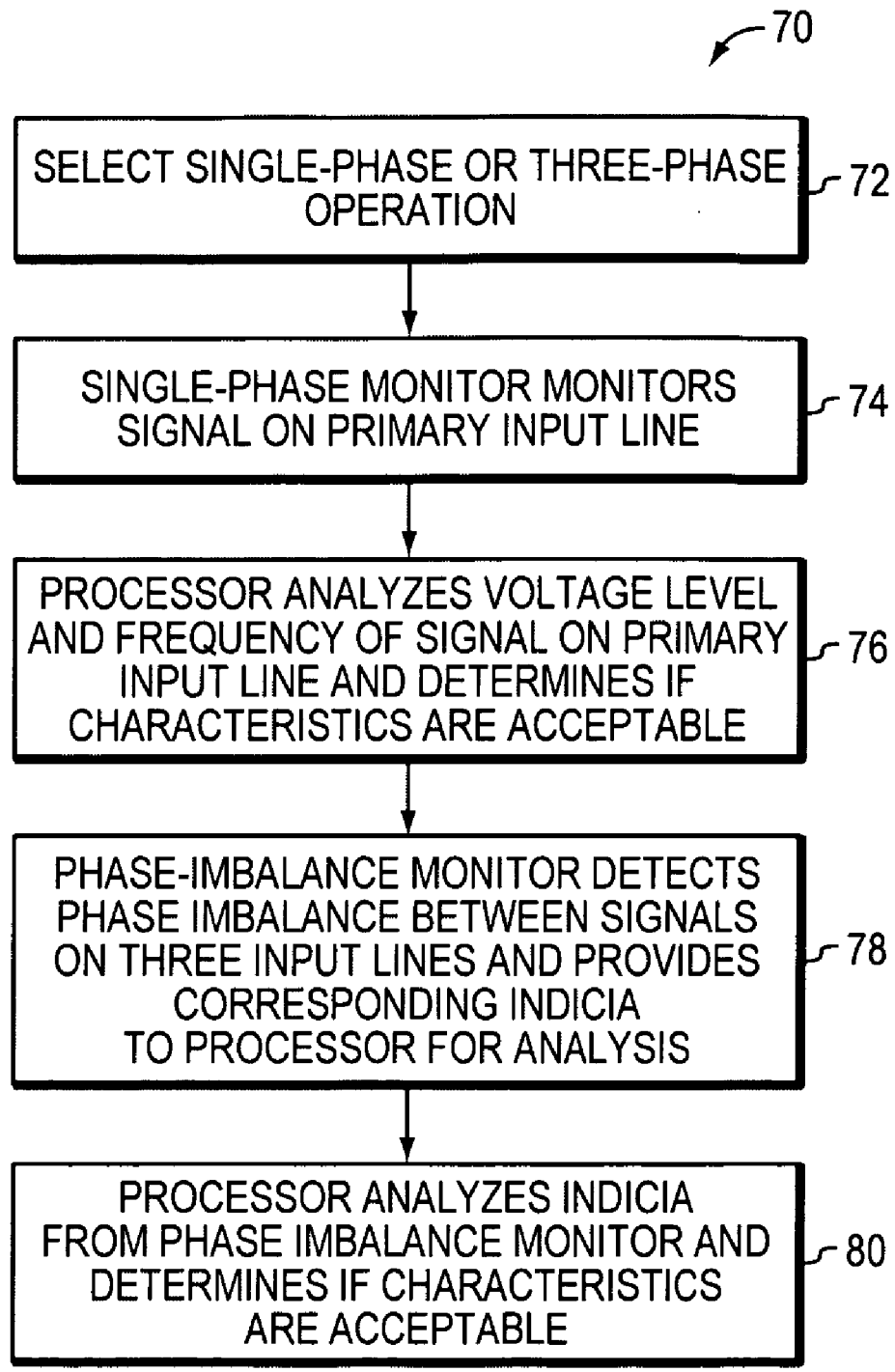
FIG. 4 is a block flow diagram of a process of controlling the circuitry shown in FIG. 2.

In operation, referring to FIG. 4, with further reference to FIGS. 1-3, a process 70 for supplying power from either the single-phase power source 14 or the three-phase power source 16 to the load 56 using the circuitry 30 includes the stages shown. The process 70, however, is exemplary only and not limiting. The process 70 may be altered, e.g., by having stages added, removed, or rearranged. Also, portions of stages (including entire stages) may be performed in parallel, simultaneously or overlapping in time.

At stage 72, the single-phase operation mode or the three-phase operation mode is selected. The user selects the mode by ensuring that the switch 44 is in the appropriate position for the desired mode, switching the position of the switch 44 if appropriate. This supplies an indication to the processor 42 as to the selected mode (either a non-zero voltage or a zero voltage). If single-phase mode operation is selected, the process 70 proceeds to stages 74 and 76 and returns to stage 72, and if three-phase mode operation is selected, the process 70 proceeds to stages 74, 76, and 78 and returns to stage 72.

At stage 74, the single-phase voltage monitor 38 monitors the signal on the line $20_1$ for voltage and frequency. The monitor 38 detects the voltage and frequency and sends output signals to the processor 42 indicating the voltage and frequency of the signal on the line $20_1$.

At stage 76, the processor 42 analyzes the voltage level and frequency of the voltage signal on line $20_1$ and determines whether the signal has acceptable characteristics. The processor ignores signals provided by the phase imbalance monitor 40. The processor 42 determines whether the voltage of the single-phase voltage signal is within acceptable limits, e.g., within an acceptable range such as less than 280 VAC RMS and more than the minimum indicated by the plot 58 shown in FIG. 3 for the power being drawn from the UPS 12. The processor 42 also determines whether the frequency of the single-phase voltage signal is within acceptable limits, e.g., within an acceptable range such as from about 45 Hz to about 65 Hz. If either of the voltage or frequency criteria are not met, then the processor 42 may produce an output signal (Battery Backup) that causes the power circuitry 32 to power the load 56 with the backup battery(ies) by closing the switch(es) 48 (50). If and when both the voltage and frequency criteria are met, the processor 42 responds by producing an output to cause the power circuitry 32 to power the load 52 from the single-phase power source 14 if the switch 44 is in the single-phase position. If the switch 44 is in the single-phase position, then the process 70 returns to stage 72, and if the switch 44 is in the three-phase position, then the process 70 proceeds to stage 78.

At stage 78, with the switch 44 in the three-phase position, the phase imbalance monitor 40 detects phase imbalance between voltage signals on the lines $20_1$-$20_3$ and provides indicia of the balance/imbalance to the processor 42. The phase imbalance monitor 40 aggregates the signals on the lines $20_1$-$20_3$, compares the aggregation against the neutral signal of the line $20_4$ and produces and sends the phase imbalance signal indicating the amount of phase imbalance (e.g., voltage level of the aggregation) to the processor 42.

At stage 80, the processor analyzes the phase imbalance output. As determined by the processor 42, if the phase imbalance indicated by the monitor 40 meets desired criteria, and the single-phase voltage signal meets desired criteria, the processor 42 produces an output that causes the power circuitry to continue to power, or switch to powering, as the case may be, the load 56 with the three-phase power source 16. If the phase imbalance indicated by the monitor 40 fails to meet desired criteria (e.g., above about 1.1V), the processor 42 produces an output that causes the power circuitry to continue to power, or switch to powering, as the case may be, the load 56 with the battery. The processor 42 continues to indicate battery power for the load 56 until the imbalance comes within more stringent, "re-passing" criteria (e.g., imbalance less than about 0.9V).

Figure 5:
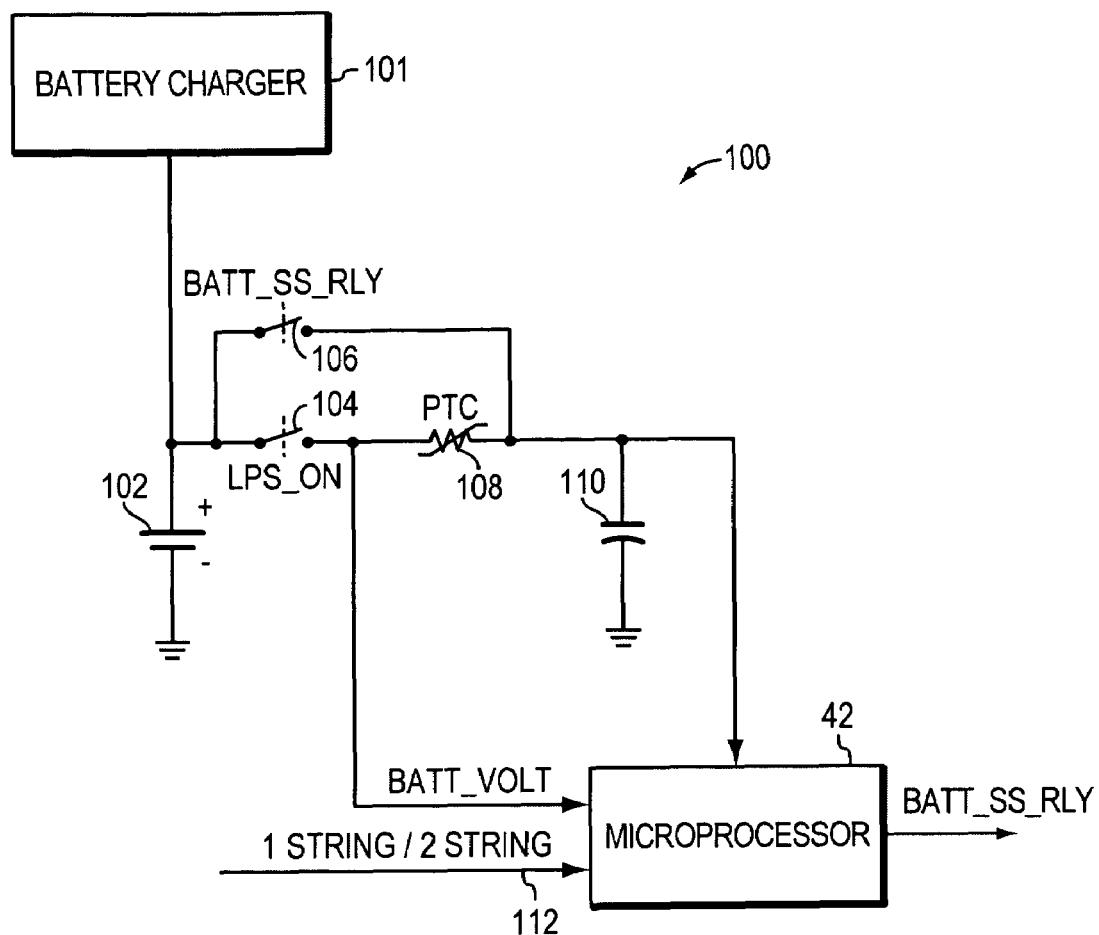
FIG. 5 is a circuit diagram of battery voltage detection and control circuitry of the UPS shown in FIG. 1.

Referring to FIGS. 1, 2 and 5, a battery soft start and low voltage detection circuit 100 comprises a battery 102, a battery charger 101, an isolation switch 104, a soft-start select switch 106, a resistor 108, a capacitor 110, and the processor 42. The circuit 100 is configured to disconnect the battery 102 when the system 10 is not in use, to regulate soft starts and normal operation, to automatically determine whether a single string of batteries is used in the UPS 12 or if multiple battery strings are used in the UPS 12, and to detect battery/battery charger failure before full or substantial battery discharge. The battery charger 101 is configured to provide energy to the battery 102 to charge the battery 102. Connections shown in FIG. 5 may not be direct connections as components may not be shown in FIG. 5 for simplicity. For example, connections from between the switch 104 and the resistance 108 to the processor 42, and from the capacitor 110 to the processor 42 are shown as direct connections, but may be indirect, including other components such as filters to reduce voltage levels, etc.

The isolation switch 104 is controlled by an in-use signal LPS_ON that causes the switch 104 to disconnect and connect the battery 102 through the resistor 108 to the capacitor 110. The LPS_ON signal closes the switch 104 when a logic power supply used by low-power control circuitry (e.g., the processor 42) is active. If the power supply is running, then the LPS_ON signal causes the switch 104 to be closed so that the battery 102 (that is typically a string of batteries) is electrically connected to the resistor 108. If the power supply is not running, then the LPS_ON signal causes the switch 104 to be open, isolating the battery 102 from the resistor 108. This helps prevent leakage current from the battery 102 from draining the battery 102 through the resistor 108, the capacitor 110, and other connected circuitry. This may be useful during storage or transit, for example.

The processor 42 is further configured to determine whether the UPS 12 has a single battery string or both a positive and a negative battery string. The processor 42 is coupled to the battery string(s) to receive a 1-string/2-string signal 112. If the signal 112 is a logical low, for example, then the UPS 12 has only one (positive) battery string and if the signal 112 is a logical high, for example, then the UPS 12 has two battery strings, one positive for connection to the switch 48 (FIG. 2) and one negative for connection to the switch 50 (FIG. 2). Thus, even before the processor 42 reads information as to the model of the UPS 12, the processor 42 can determine the battery string configuration of the UPS 12. If the UPS 12 uses a single battery string, then the processor 42 controls and monitors the circuit 100 for a positive string. If the UPS 12 has both positive and negative battery strings, then the processor 42 monitors and controls the circuit 100 and a similar circuit (not shown) in which the polarity of the battery 102 is reversed.

The processor 42 is further configured to control the soft-start select switch 106 to control current flow from the battery 102 to the capacitor 110. During soft-start, the processor 42 sends a relay-control signal BATT_SS_RLY to the switch 106 to cause the switch 106 to be open so that current will flow from the battery 102 through the switch 104 (assuming it is closed) and the resistor 108 to the capacitor 110. The resistor 108 provides resistance to limit the current from the battery 102 during soft start for charging the bulk electrolytic capacitor 110. For normal operation once the capacitor 110 is charged, the processor 42 sends the relay-control signal BATT_SS_RLY to the switch 106 to cause the switch 106 to be closed so that the switch 104 and the resistor 108 are bypassed, with current from the battery 102 flowing directly to the capacitor 110.

The processor 42 is further configured to detect battery/battery charger failures prior to substantial or full battery discharge. While only the positive battery string circuit 100 is shown in FIG. 5, a similar circuit is provided for a negative battery string, and both circuits are monitored/controlled as described if both positive and negative battery strings are used in the UPS 12. The processor 42 is coupled to the circuit 100 between the isolation switch 104 and the resistor 108. The processor 42 is configured to determine if the battery 102 or its charger has failed by determining whether the monitored battery voltage decreases more often than it increases, or the battery voltage is below a battery voltage floor. The processor 42 periodically samples the battery voltage BATT_VOLT and maintains a counter that is disabled if the battery voltage is above a threshold, such as a level near the charging "float voltage" of the battery 102 (e.g., 210V for a maximum battery voltage of 218.5V). If the battery voltage is below the threshold, the processor 42 starts the counter at a counter threshold/reset value (e.g., 10), decrements the counter if the battery voltage at a reading time has decreased relative to the last reading, and increments the counter (but not beyond the initial counter threshold, e.g., 10) if the battery voltage has increased relative to the last reading. The counter may be incremented and decremented by positive or negative steps of nonzero numbers of various, and possibly different, values. For example, increments of 3 and decrements of 2 for battery voltage reductions and increases, respectively, may be used. If the battery voltage increases above the floor value, then the counter is reset and disabled. If the counter reaches zero, then the processor 42 provides an alert to a user of the UPS 12 that the battery 102 and/or the battery charger has failed and that the battery 102 may not be able to provide sufficient power. In response to the alert, the user may take appropriate remedial action such as replacing/repairing the battery 102 and/or the charger 101. The processor 42 may thus determine and indicate a failure before the battery 102 has fully or even substantially discharged/exhausted. This may help the processor 42 detect hardware failures, e.g., the transfer switch 48 sticking, or anything affecting the battery charger. If two battery strings are used in the UPS 12, then the processor uses and monitors two separate counters, one for each of the battery strings. The processor 42 may also indicate a failure if the battery voltage drops below a minimum voltage floor, such as 150V for a maximum voltage of 218.5V, at any reading.

Figure 6:
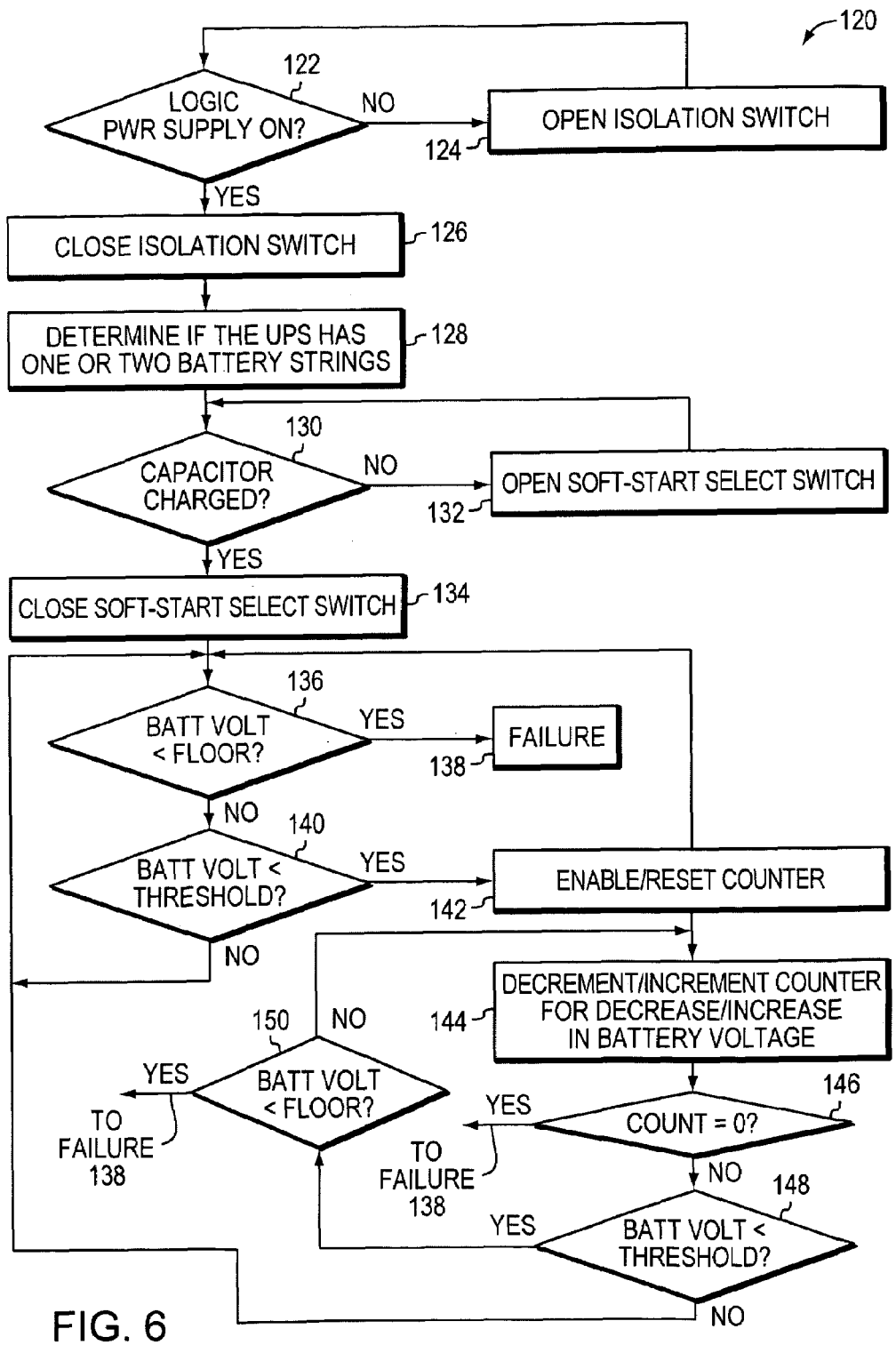
FIG. 6 is a block flow diagram of a process of using the circuitry shown in FIG. 5.

In operation, referring to FIG. 6, with further reference to FIGS. 1, 2, and 5, a process 120 for monitoring and controlling battery charge operation using the circuit 100 includes the stages shown. The process 120, however, is exemplary only and not limiting. The process 120 can be altered, e.g., by having stages added, removed, or rearranged.

At stage 122, the LPS_ON signal indicates whether the logic power supply of the UPS 12 is on. If the logic power supply is not on, then at stage 124 the LPS_ON signal causes the switch 104 to be open. If the logic power supply is on, then at stage 126 the LPS_ON signal causes the switch 104 to be closed.

At stage 128, the processor 42 determines whether the UPS 12 has one or two battery strings. The processor 42 determines whether the one-string/two-string signal 112 is a logical high or a logical low, and if the signal 112 indicates only one string, then the processor enables monitoring/controlling of only the circuit 100 for the positive battery string, and if the signal 112 indicates two strings, then the processor 42 enables monitoring and controlling of both the positive and negative battery strings.

At stage 130, the processor 42 determines whether the capacitor 110 is charged. The processor 42 monitors the voltage on the capacitor 110, BATT_BUS. If the capacitor 110 is not charged, then at stage 132 the processor 42 sends the relay-control signal BATT_SS_RLY to cause the soft-start select switch 106 to be open. If the capacitor 110 is charged, then at stage 134 the processor 42 sends the relay-control signal BATT_SS_RLY to cause the soft-start select switch 106 to be closed, bypassing the isolation switch 104 and the resistor 108.

At stage 136, the battery voltage is measured and the processor 42 determines whether the battery voltage is below a voltage floor. If the battery voltage is below this floor, then the process 120 proceeds to stage 138 where the processor 42 provides an indication that the battery 102 and/or the battery charger 101 is failing and the battery 102 may not provide sufficient power for the load 56. If the battery voltage is above the floor/minimum voltage, then the process 120 proceeds to stage 140.

At stage 140, the processor 42 determines whether the battery voltage is below a threshold voltage level. If the battery voltage is not below this threshold, then the process 120 returns to stage 136 and continues to monitor the battery voltage for drops below the threshold. If the battery voltage is below this threshold, then the process 120 proceeds to stage 142.

At stage 142, the processor 42 initializes the counter for determining battery-related failures. The processor 42 resets the counter, e.g., to 10, and enables the counter to be incremented (preferably not beyond the reset level/threshold) and decremented.

At stage 144, the processor decrements or increments the counter as appropriate, and leaves the counter unchanged if the battery voltage is unchanged. If the battery voltage has been above the threshold voltage previously, then for the first visit to stage 144, the processor 42 will decrement the counter. If the battery voltage has yet to meet or exceed the threshold voltage, then for the first visit to stage 144 the present voltage level is stored for future comparison to determine if the battery voltage has decreased or increased. After the first visit to stage 144, the processor 42 compares the present reading with the previous reading and increments the counter (preferably not beyond the reset level/threshold) if the present reading is greater than the previous reading and decrements the counter if the present reading is lower than the previous reading. If there is no change (e.g., within a small tolerance range) in battery voltage, the counter is not changed.

At stage 146, the processor 42 determines whether the counter has reached zero (or some other designated value). If so, then the process 120 proceeds to stage 138 to indicate a battery/battery charger failure. If the counter has not reached zero, then the process 120 proceeds to stage 148.

At stage 148, the battery voltage is again measured and the processor 42 again checks the relative present level of the battery voltage. If the battery voltage is now above the threshold, then the counter is disabled and the process 120 returns to stage 136 for further monitoring of the battery voltage. If the battery voltage remains below the threshold (e.g., 210V for a maximum battery voltage of 218.5V), then the process 120 proceeds to stage 150.

At stage 150, the processor 42 determines whether the battery voltage is below the voltage floor. If the battery voltage is below the floor, then the process 120 proceeds to stage 138 where the processor 42 provides an indication that the battery 102 and/or the battery charger 101 is failing and the battery 102 may not provide sufficient power for the load 56. If the battery voltage is above the floor/minimum voltage, then the process 120 returns to stage 144 for decrementing/incrementing the counter as appropriate.

Referring to FIGS. 1-3, the processor 42 is configured to provide a load-dependent range of acceptable input voltages. This range may be wider than previous UPS designs, especially depending upon the load. A user of the UPS 12 can "cold boot" the UPS 12 using the battery string(s) instead of AC power from one of the source 14, 16. This may be done, e.g., if the source power is nonexistent or lower than required to start the UPS 12. The processor 42 is configured, however, to re-evaluate the power that the AC source 14, 16 can provide after startup. The processor 42 is configured to determine the load, e.g., the percentage of maximum rated load, that is currently being used and the voltage level of the AC source 14, 16 that is presently available. The processor 42 will use these values in conjunction with FIG. 3 to determine whether the source voltage is sufficient for powering the load 56. If the presently-available source voltage is equal to or higher than the voltage corresponding to the present percent load from the plot 58 in FIG. 3, then the processor 42 will cause the UPS 12 to switch to AC line power from battery power, and cause the UPS 12 to remain on battery power otherwise.

Figure 11:
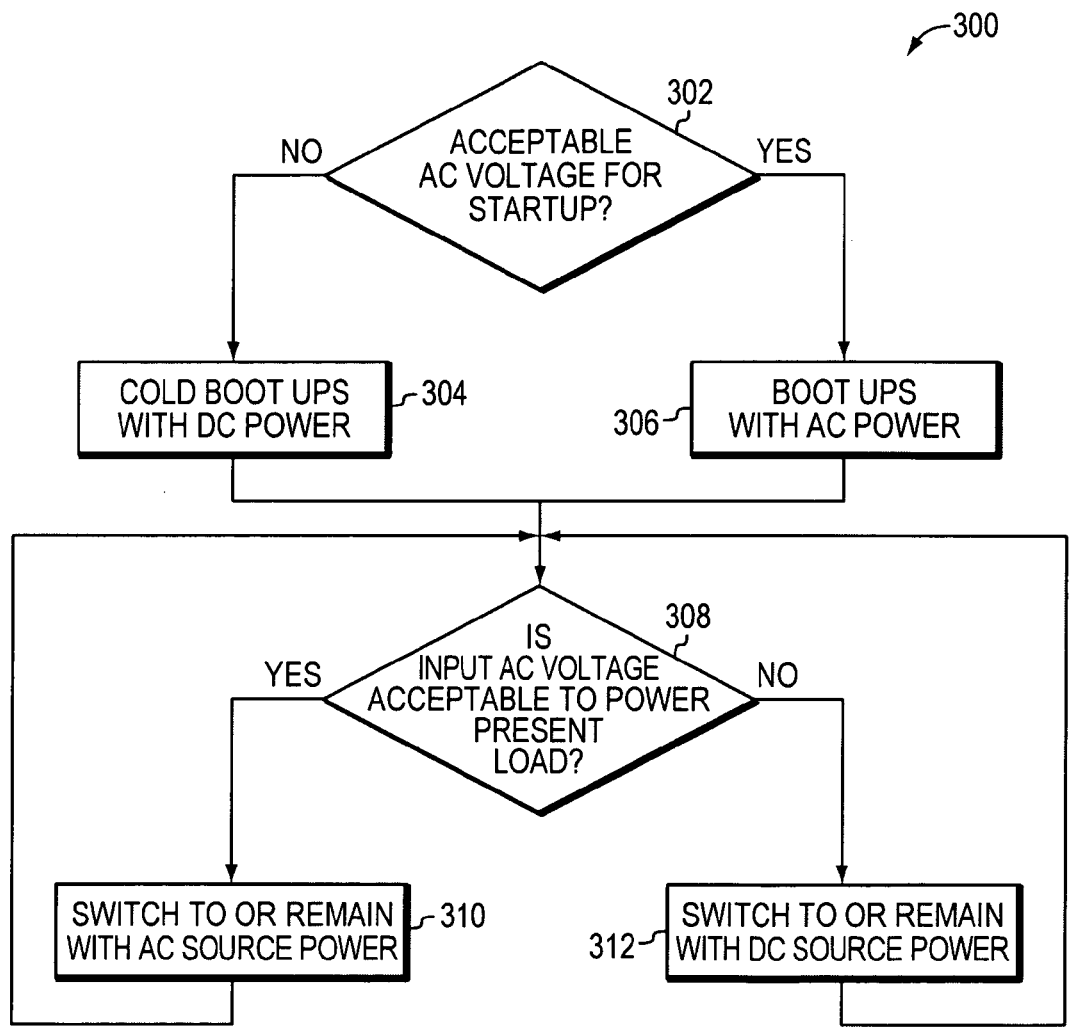
FIG. 11 is a block flow diagram of a process of supplying power to a UPS from battery power or utility power.

In operation, referring to FIG. 11, with further reference to FIGS. 1-3, a process 300 for monitoring and controlling battery versus AC line powering of the load 56 using the circuit 30 includes the stages shown. The process 300, however, is exemplary only and not limiting. The process 300 can be altered, e.g., by having stages added, removed, or rearranged.

At stage 302, an inquiry is made as to whether the AC source voltage is acceptable/adequate for startup of the UPS 12. This may be done by a user or by the processor 42. The user or the processor 42 determines whether the present voltage of the AC source 14, 16 can provide the power to be used by the load 56 without providing more current than is acceptable (e.g., without damaging components of the circuit 30). For example, if the present AC voltage is below 150 VAC RMS, then it is assumed that the AC source voltage is unacceptable. If the AC source voltage is determined to be unacceptable, then at stage 304 the UPS 12 is cold booted using the DC power source. If it is determined that the AC source voltage is acceptable, then at stage 306 the UPS 12 is booted using the AC source 14, 16.

At stage 308, the processor 42 evaluates the load power drawn from the UPS 12 and re-evaluates the AC input voltage level against the load-dependent voltage deemed to be sufficient to power varying loads. Here, the processor 42 determines the load power and uses the plot 58 shown in FIG. 3 to determine an AC source voltage that would be sufficient to power the present load 56 without drawing more than an acceptable amount of current from the AC source. If the processor 42 determines that the present input AC voltage is of a sufficient level to support the present load without having too much current drawn into the UPS 12, then the process 300 proceeds to stage 310 where the processor 42 will cause the UPS 12 to switch to, or remain connected to, AC line power. If the processor 42 determines that the present input AC voltage is of an insufficient level to support the present load without having too much current drawn into the UPS 12, then the process proceeds to stage 312 where the processor 42 will cause the UPS 12 to switch to or remain on battery power. The process 300 returns to stage 308 for further re-evaluation of the present AC input voltage relative to the present load power.

Referring to FIGS. 1-2, the UPS 12 includes a serial port 26 configured to receive digital signals for reprogramming the processor 42. The processor 42 is coupled to the serial port 26 and can receive reprogramming instructions via the port 26. During processor reprogramming, the UPS 12 is preferably put in bypass mode. The processor 42 can be reprogrammed in-circuit, without disconnecting the processor 42, and in-application, with the UPS 12 continuing to behave as a UPS in bypass mode. Thus, the UPS 12 can still support the load 56 while the processor 42 is being reprogrammed as long as the AC line power is sufficient for the load 56. The processor 42 is an electrically reprogrammable (Flash-based) controller. The processor 42 includes an instruction set/program and a microprocessor that is configured to execute the program. The processor 42 is reprogrammed by modifying the associated program/instruction set, although the program itself may be disposed external to the microprocessor.

The UPS 12 may optionally contain a network interface card (NIC) 27 in an optional accessory slot 28. The NIC 27 is connected to the serial port 26, is configured to connect to and communicate with a communication network 29 (e.g., the Internet), and can be used as a user interface to perform the processor reprogramming using, e.g., files downloaded from the World Wide Web. The NIC 27 can provide error checking to help avoid reprogramming problems. The NIC 27 may be bypassed so that the reprogramming may be done directly from the serial port 26. Thus, the processor 42 may be reprogrammed without shutting down the load 56, and without providing a maintenance bypass (bypassing the entire UPS 12), and can be easily performed in the field.

The power supply circuitry 32 further includes a waveshape detector 55. The detector 55 is configured to monitor the inverter output and determine whether the waveshape of the inverter output signal is within acceptable limits and is therefore valid, or is outside the limits and is therefore invalid. The detector 55 is configured to provide a valid/invalid output signal to the processor 42 to indicate whether the waveshape of the inverter output signal is valid or invalid. Although the detector 55 is shown separate from the processor 42, the detector 55 may be incorporated into the processor 42.

The UPS 12 is configured to detect short circuits at its output and to inhibit the short circuit from being passed to the sources 14, 16. The processor 42 is coupled to and configured to monitor the output of the inverter 54 via an Inverter Output line and to control whether the inverter 54 is operational through an Inverter Control signal. At startup, the UPS output power is initially provided through its current-limited inverter 54. The inverter 54 is configured to limit its current output to a maximum level in a current-limiting mode (e.g., for short-circuited loads or other loads that would draw more current than desired, e.g., than components of the UPS 12 can support and/or that would damage such components). With the inverter 54 in current-limit mode, detection of an invalid inverter voltage output waveshape by the waveshape detector 55 is disabled (e.g., to avoid erroneous error detections during startup). In this case, the detector 55 may provide a valid waveshape output signal regardless of the inverter output's waveshape and/or the processor 42 may ignore the waveshape valid/invalid signal and/or assume that the signal indicates a valid waveshape. If the inverter's output voltage is sensed/determined to be close to zero (e.g., below about 40V) for a predetermined threshold amount of time (e.g., about 500 ms), then the processor 42 will turn off the inverter 54 using an inverter control signal sent to the inverter 54. Other threshold times may be used, but preferably the time is long enough to avoid detection of false failures due to normal load transients (i.e., enough time for the load transient to end). The time delay is provided to help prevent load transients or startup transients from causing the processor 42 to turn the UPS output off. With the inverter 54 off, a short circuit at the load will not be propagated to the source 14, 16, that could cause source overcurrent protection devices (e.g., fuses, breakers) to operate. Such upstream fuses or breakers would need to be replaced or reset, typically manually. The triggering of the overcurrent protection devices would also disrupt power to other electrical devices supplied through those overcurrent protection devices.

Figure 7A:
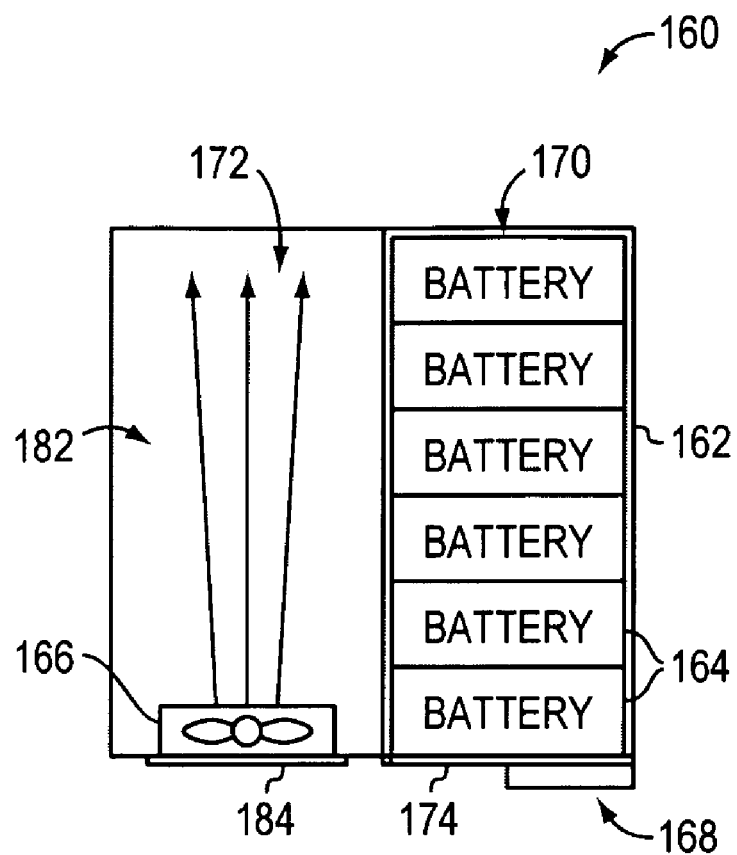
FIG. 7A is a top cutaway view of an embodiment of the UPS shown in FIG. 1.
Figure 7B:
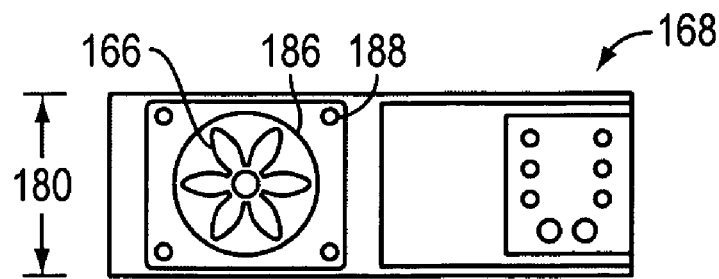
FIG. 7B is a front view of the embodiment of the UPS shown in FIG. 7A.
Figure 8:
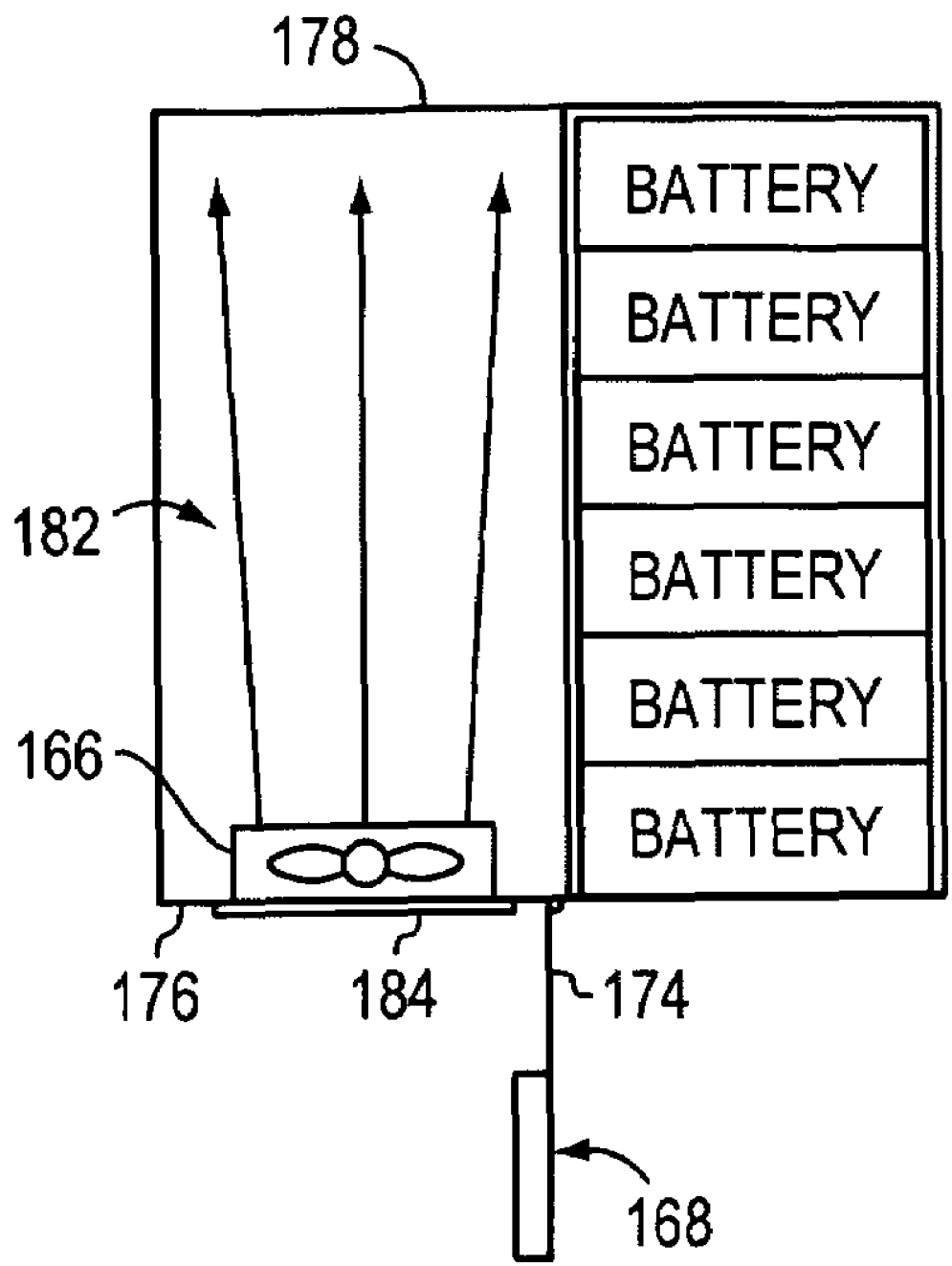
FIG. 8 is a top cutaway view of the embodiment of the UPS shown in FIG. 7A with a door of the UPS in an open position.
Figure 9A:
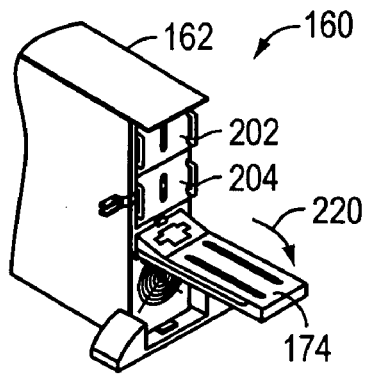
FIGS. 9A-9C are perspective views of portions of another embodiment of the UPS shown in FIG. 1 depicting removal of battery modules from the UPS.
Figure 9B:
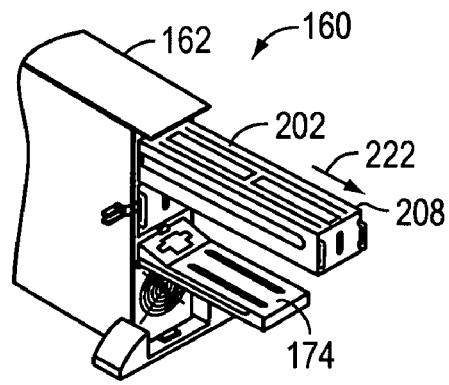
Figure 9C:
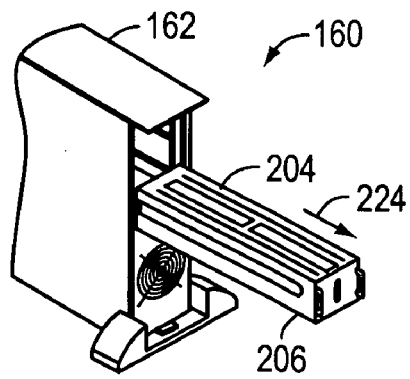

Referring to FIGS. 7A, 7B, and 8, a UPS 160 includes a housing 162, several batteries 164, a fan 166, and a control panel 168. The housing 162 may be configured as shown here as a rack-mount housing to be inserted, e.g., slid, into a standard 19" equipment rack (not shown), or as a stand-alone tower as shown in FIGS. 9A-9C (with the addition of stabilizing feet). The housing 162 is further configured to house the batteries 164 in a battery compartment 170, and to house electronics in an electronics compartment 172. The electronics compartment 172 is configured to house electronics modules for charging the batteries 164, controlling discharge of the batteries 164, and regulating electrical power delivered through the UPS 160. A door 174 is pivotally and/or removably coupled to the housing 162 to provide selective access to the battery compartment 170. The door 174 can be rotated from a closed position shown in FIGS. 7A and 7B to an open position shown in FIG. 8 to provide access to the batteries 164. Alternatively, the door 174 may be removed to provide battery access. A control panel 182 is coupled to the door 174 for monitoring and controlling the batteries 164 and electronics disposed in the compartment 172. A communication cable coupled to the panel 182 is preferably routed along the door 174 to help prevent damage and interference while the door 174 is open and batteries 164 are replaced, repaired, and/or otherwise accessed.

The fan 166 is coupled to an end wall 176 of the housing 162 forming part of the boundary of the electronics compartment 172. The end wall 176 provides one or more openings for air to pass through the wall 176 and the fan is disposed to be in fluid communication with the opening(s). An opposite end wall 178 from the end wall 176 provides one or more openings for air to flow out of the compartment 172. The fan 166 is configured to draw air through the end wall 176, force it through the compartment 172 over electronics disposed in the compartment 172 an out of the housing 162 through the opposite end wall 178. Preferably, the fan 166 is as large as possible given the physical constraints of the size of the end wall 176, and preferably extends and overlaps substantially an entire width 180 of the wall 176. The fan 166 may include one or more fan blades 182 to help maximize the amount of surface area of the end wall 176 covered by the fan 166 and to maximize front-to-back airflow as indicated by arrows 182.

The UPS 160 further includes a bracket 184 for mounting the fan 166 to the housing/chassis 162. The bracket 184 provides a hole or passage 186 to allow air to pass through to the fan 166. The bracket 184 is coupled to the fan 166 and can be attached to the outside of the housing 162 with mounting hardware 188, e.g. screws. The fan 166 can be inserted through the opening in the housing 162 while attached to the bracket 184, and then the bracket 184 fastened to the outside of the housing end wall 176. The fan 166 can be removed from the housing 162, e.g., for repair or replacement, without disassembling the UPS 160. To remove the fan 166, the mounting hardware is released (e.g., unscrewed) and the fan 166 extracted through the opening in the end wall 176.

Referring to FIGS. 9A-9C, the UPS 160 includes multiple universal battery modules, here the modules 202 and 204, configured to be inserted into and removed from the chassis 162. The modules 202, 204 are universal in that they can be inserted into and used with multiple different UPS configurations. The door 174 is shown in FIGS. 9A and 9B, but not 9C. The UPS 160 is a mid-range UPS having a capacity between about 3 KVA and about 10 KVA, e.g., 3 KVA, 5 KVA, 7.5 KVA, or 10 KVA. The replaceable battery modules 202, 204 are configured to be easily replaced without disconnecting the UPS 160 from the electrical grid AC power supply. The battery modules 202, 204 are preassembled into battery module housings 206, 208 and include appropriate safety circuitry. The modules 202, 204 are configured to be of a weight that is safe for a single person to handle, e.g., as determined by a safety standards organization (e.g., OSHA). The modules 202, 204 have weights of less than about 40 lbs each, such as about 38 lbs each. FIGS. 9A-9C depict opening the door 174 and removing the modules 202, 204 as indicated by arrows 220, 222, 224. The modules 202, 204 may be inserted into the UPS 160 in a reverse of the procedure depicted in FIGS. 9A-9C. More than two battery modules, e.g., four, etc. may be used in a UPS with a housing configured to receive the desired number of modules. The module housings 206, 208 are configured to inhibit a user/handler from contacting any electrically-live or otherwise dangerous objects in the modules 202, 204, and can be considered finger-proof according to safety agency regulations, e.g., UL and VDE requirements. For example, the housings 206, 208 do not have (are free of) openings that are large enough (i.e., are too small) for a person to insert a finger and are located such that an inserted finger could not reach a live or otherwise dangerous object. In particular, as each of the modules 202, 204 may be a source of 96V DC, the modules 202, 204 are configured such that the electrical contacts of the modules 202, 204 are finger-proof.

Figure 10A:
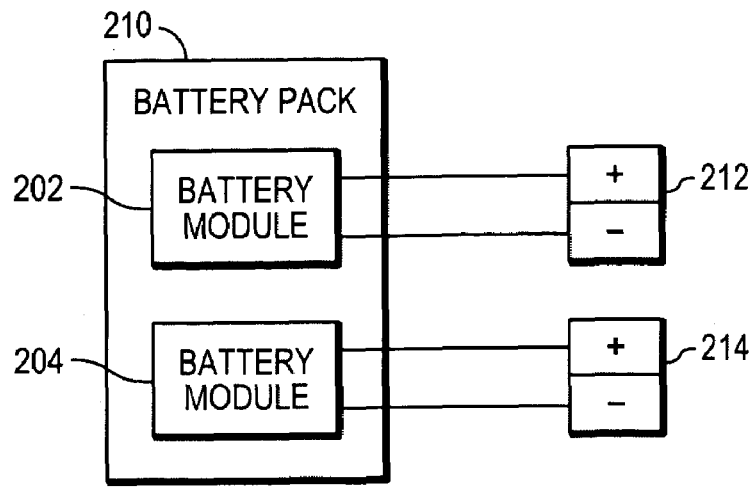
FIG. 10A is a block diagram of electrical connections of the battery modules shown in FIGS. 9A-9C to the remainder of the UPS.
Figure 10B:
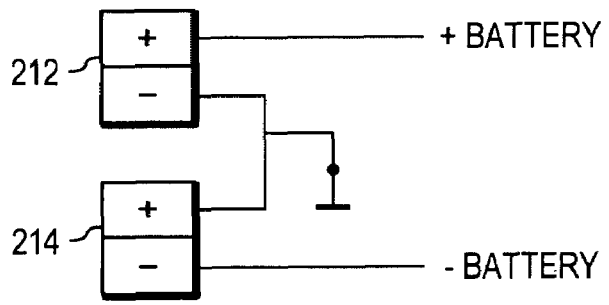
FIGS. 10B-10C are electrical diagrams of electrical connections of the battery module voltages within the UPS.
Figure 10C:
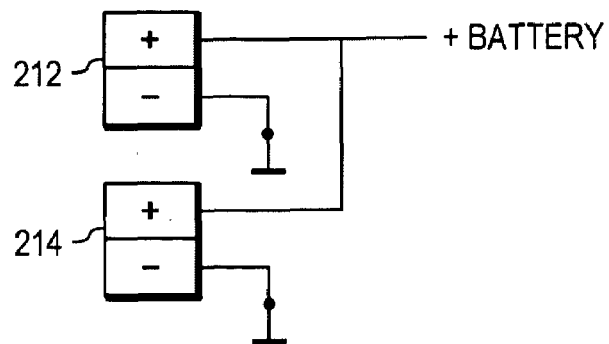

Referring to FIGS. 10A-10C, battery connections internal to the UPS 160 are configured to provide different voltage levels and polarities using the same battery modules 202, 204. FIG. 10A shows that the battery modules 202, 204 are connected to corresponding battery contacts 212, 214 when inserted in the UPS housing 162 (FIG. 9). Different UPSs are configured to couple the battery modules 202, 204 differently to provide different voltage levels. Referring to FIG.

9B, inside the UPS 160 the battery contacts 212, 214 are coupled in series through ground to provide a positive battery voltage, e.g., of +96 VDC, and a negative battery voltage, e.g., of −96 VDC. Referring to FIG. 9C, in another embodiment inside the UPS 160 the battery contacts 212, 214 are coupled in parallel to provide a positive battery voltage, e.g., of +96 VDC. If four battery modules are used in the UPS, the modules may be coupled in series in pairs. Thus, FIGS. 9B and 9C, the battery contacts 212 and 214 would represent series-coupled pairs, and the embodiment of FIG. 9B would provide, e.g., +192 VDC and −192 VDC, and the embodiment of FIG. 9C would provide +192 VDC. Thus, the same configuration of battery modules 202, 204 (which are themselves preferably are of similar or identical configuration) may be used in different UPSs that provide different voltage ratings.

Other embodiments are within the scope and spirit of the appended claims. For example, due to the nature of software, processor functions described above can be implemented using software, hardware, firmware, hardwiring, or combinations of any of these. Features implementing functions may also be physically located at various positions, including being distributed such that portions of functions are implemented at different physical locations. Further, while the discussion above regarding FIG. 2 discussed connecting either AC power or DC power to the load 56, both the AC power source and the DC power source may be connected to the load simultaneously, e.g., for varying times and/or with varying degrees of filtering and/or reduction of power from the sources.

The invention claimed is:

1. An uninterruptible power supply (UPS) system comprising:
   an AC power input configured to receive AC power from a single-phase AC power source or a multi-phase AC power source;
   a DC power source;
   an output circuit including a power output;
   a controllable switch configured to selectively couple at least one of the AC power input and the DC power source to the output circuit;
   a processor coupled and configured to receive an input signal that indicates a single-phase AC mode or a multi-phase AC mode and provide an output signal that affects operation of the UPS depending upon which of the single-phase AC mode and the multi-phase AC mode is indicated; and
   a phase imbalance monitor coupled to the processor and to at least two AC input lines of the AC power input for receiving at least two corresponding voltage signals from the multi-phase AC power source, the imbalance monitor configured to provide an imbalance indication of imbalance of the at least two corresponding voltage signals,
   wherein the processor is configured to determine from the imbalance indication whether multi-phase operation of the UPS is applicable.

2. The system of claim 1 further comprising a user-selectable switch, coupled to the processor, that indicates which of the single-phase mode and the multi-phase mode is applicable.

3. The system of claim 1 wherein the phase imbalance monitor is configured to aggregate the at least two corresponding voltage signals and compare the aggregated signal to a reference.

4. The system of claim 1 further comprising a user-selectable switch, coupled to the processor, that indicates which of the single-phase mode and the multi-phase mode is applicable, and wherein if the user-selectable switch indicates the multi-phase mode and the phase imbalance monitor indicates that the multi-phase mode of the UPS is inapplicable, the processor causes the controllable switch to couple the DC power source to the output circuit.

5. The system of claim 1 further comprising a single-phase voltage monitor coupled to one AC input line of the AC power input for receiving a corresponding input voltage signal and configured to provide indicia of at least one of a voltage and a frequency of the input voltage signal.

6. The system of claim 5 wherein the processor is configured to cause the controllable switch to connect the DC power source to the output circuit if at least one of the voltage of the input voltage signal has an unacceptable voltage value and the frequency of the input voltage signal has an unacceptable frequency value.

7. The system of claim 1, further comprising a single phase voltage monitor coupled to the processor.

8. The system of claim 2, wherein the user selectable switch couples and decouples a voltage to the processor depending upon which of the single-phase mode and the multi-phase mode is applicable.

9. The system of claim 3, wherein the phase imbalance monitor generates a voltage signal based on a comparison of the aggregated signal and the reference, and wherein the processor generates a failure indication when the voltage signal is greater than a first value.

10. The system of claim 9, wherein the processor maintains the failure indication until the voltage signal decreases to a second value that is less than the first value by a predetermined amount.

11. A method of supplying power to an electrical load with a UPS, the method comprising acts of:
    configuring an AC input of an uninterruptible power supply to receive AC power from either of a single-phase AC power source or a multi-phase AC power source;
    coupling, in a first mode of operation, the AC input to output circuitry of the uninterruptible power supply;
    coupling, in a second mode of operation, a DC input to the output circuitry;
    providing a first signal indicative of whether the UPS should operate in a single-phase AC mode or a multi-phase AC mode;
    generating a second signal, in response to the first signal, to adjust an operation of the UPS depending upon whether the single-phase operation or the multi-phase operation is indicated;
    detecting a first voltage signal from a first phase of the AC input;
    detecting a second voltage signal from a second phase of the AC input;
    determining an imbalance between the first voltage signal and the second voltage signal;
    generating an imbalance indication; and
    determining, from the imbalance indication, whether the multiphase mode of the uninterruptible power supply is applicable.

12. The method of claim 11, wherein the uninterruptible power supply includes a processor and a user-selectable switch, and wherein the method further comprises acts of coupling the user-selectable switch to the processor, and selecting one of the single-phase operation and the multi-phase operation with the user-selectable switch.

13. The method of claim 11, further comprising acts of generating an aggregated signal by aggregating the first voltage signal and the second voltage signal, and comparing the aggregated signal to a reference.

14. The method of claim 11, wherein the uninterruptible power supply includes a user-selectable switch coupled to a processor and wherein the method further comprises acts of:
detecting a position of the user-selectable switch; and
coupling the DC input to the output circuitry when the position of the user-selectable switch is detected in a position corresponding to a selection of the multi-phase mode and the imbalance indication indicates that the multi-phase mode of the UPS is inapplicable.

15. The method of claim 11, wherein the uninterruptible power supply further comprises a single-phase voltage monitor, the method further comprising acts of:
receiving, with the single-phase voltage monitor, a voltage signal from a line of the AC input; and
indicating, with the single-phase voltage monitor, at least one of a voltage and a frequency of the voltage signal.

16. The method of claim 15, further comprising acts of coupling the DC power source to the output circuit if either the voltage or the frequency is unacceptable.

17. The method of claim 12, wherein the processor is adapted to generate the second signal.

18. The system of claim 1, further comprising a power factor correction circuit, wherein the output signal affects an operation of the power factor correction circuit.

19. The system of claim 18, further comprising a reference select circuit configured to provide at least one reference signal employed by the power factor correction circuit.

20. The system of claim 19, wherein the output signal affects an operation of the reference select circuit.

21. An uninterruptible power supply (UPS) system comprising:
an AC power input configured to receive AC power from a single-phase AC power source or a multi-phase AC power source;
a DC power source;
an output circuit including a power output;
a controllable switch configured to selectively couple at least one of the AC power input and the DC power source to the output circuit;
a processor coupled and configured to affect operation of the output circuit depending upon which of single-phase and multi-phase operation of the UPS is indicated; and
a phase imbalance monitor coupled to the processor and to at least two AC input lines of the AC power input for receiving at least two corresponding voltage signals from the multi-phase AC power source, the imbalance monitor configured to provide an imbalance indication of imbalance of the at least two corresponding voltage signals,
wherein the processor is configured to determine from the imbalance indication whether multi-phase operation of the UPS is applicable.

22. The system of claim 21 further comprising a user-selectable switch, coupled to the processor, that indicates which of single-phase and multi-phase operation of the UPS is applicable.

23. The system of claim 21, wherein the phase imbalance monitor is configured to aggregate the at least two corresponding voltage signals and compare the aggregated signal to a reference.

24. The system of claim 21 further comprising a user-selectable switch, coupled to the processor, that indicates which of single-phase and multi-phase operation of the UPS is applicable, and wherein if the user-selectable switch indicates multi-phase operation and the phase imbalance monitor indicates that multi-phase operation of the UPS is inapplicable, the processor causes the controllable switch to couple the DC power source to the output circuit.

25. The system of claim 21 further comprising a single-phase voltage monitor coupled to one AC input line of the AC power input for receiving a corresponding input voltage signal and configured to provide indicia of at least one of a voltage and a frequency of the input voltage signal.

26. The system of claim 25 wherein the processor is configured to cause the controllable switch to connect the DC power source to the output circuit if at least one of the voltage of the input voltage signal has an unacceptable voltage value and the frequency of the input voltage signal has an unacceptable frequency value.

27. The system of claim 21, further comprising a power factor correction circuit, wherein the output signal affects an operation of the power factor correction circuit.

28. A method of supplying power to an electrical load, the method comprising acts of:
configuring an AC input of an uninterruptible power supply to receive AC power from either of a single-phase AC power source or a multi-phase AC power source;
coupling, in a first mode of operation, the AC input to output circuitry of the uninterruptible power supply;
coupling, in a second mode of operation, a DC input to the output circuitry;
adjusting an operation of the output circuitry in response to an indication of whether a single-phase operation or a multi-phase operation is selected;
detecting a first voltage signal from a first phase of the AC input;
detecting a second voltage signal from a second phase of the AC input;
determining an imbalance between the first voltage signal and the second voltage signal;
generating an imbalance indication; and
determining, from the imbalance indication, whether the multiphase mode of the uninterruptible power supply is applicable.

29. The method of claim 28, wherein the uninterruptible power supply includes a processor and a user-selectable switch, and wherein the method further comprises acts of coupling the user-selectable switch to the processor, and selecting one of the single-phase operation and the multi-phase operation with the user-selectable switch.

30. The method of claim 28, further comprising acts of generating a first signal by aggregating the first voltage signal and the second voltage signal, and comparing the first signal to a reference.

31. The method of claim 28, wherein the uninterruptible power supply includes a user-selectable switch coupled to a processor and wherein the method further comprises acts of:
detecting a position of the user-selectable switch; and
coupling the DC input to the output circuitry when the position of the user-selectable switch is detected in a position corresponding to a selection of a multi-phase operation and the imbalance indication indicates that multi-phase operation of the UPS is inapplicable.

32. The method of claim 28, wherein the uninterruptible power supply further comprises a single-phase voltage monitor, the method further comprising acts of:
receiving, with the single-phase voltage monitor, a voltage signal from a line of the AC input; and
indicating, with the single-phase voltage monitor, at least one of a voltage and a frequency of the voltage signal.

33. The method of claim 32, further comprising acts of coupling the DC power source to the output circuit if either the voltage or the frequency is unacceptable.

34. The method of claim 29, wherein the processor is adapted to generate the second signal.

* * * * *